United States Patent
Tatsuzawa et al.

(10) Patent No.: US 8,283,621 B2
(45) Date of Patent: Oct. 9, 2012

(54) OPTICAL APPARATUS, IMAGING APPARATUS, AND MANUFACTURING METHOD FOR OPTICAL APPARATUS WITH HOLDING MEMBER FOR MAINTAINING POSITIONAL RELATION BETWEEN OPTICAL ELEMENTS

(75) Inventors: Naotaka Tatsuzawa, Saitama (JP);
Kyouji Genda, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 445 days.

(21) Appl. No.: 12/630,222

(22) Filed: Dec. 3, 2009

(65) Prior Publication Data
US 2010/0140459 A1  Jun. 10, 2010

(30) Foreign Application Priority Data
Dec. 10, 2008  (JP) .................................. 2008-314325

(51) Int. Cl.
*H01J 3/14*  (2006.01)
*G02B 7/02*  (2006.01)

(52) U.S. Cl. ........................................ 250/216; 359/811

(58) Field of Classification Search .................. 250/216, 250/239; 359/811, 819
See application file for complete search history.

(56) References Cited

U.S. PATENT DOCUMENTS

| 5,757,559 A * | 5/1998 | Nomura et al. | 359/819 |
| 7,286,307 B2 * | 10/2007 | Yamamoto et al. | 359/819 |
| 2004/0130807 A1 * | 7/2004 | Hattori et al. | 359/811 |

FOREIGN PATENT DOCUMENTS

| CN | 1721901 A | 1/2006 |
| JP | 63-269323 (A) | 11/1988 |
| JP | 7-210892 (A) | 8/1995 |

* cited by examiner

*Primary Examiner* — Thanh Luu
(74) *Attorney, Agent, or Firm* — Foley & Lardner LLP

(57) ABSTRACT

An optical device includes a first optical component and a second optical component that are adjacent to each other in a direction of an optical axis. The optical device further includes a holding member that is formed with a resin material absorbing laser beams and that holds the first optical component via an elastic property of the resin material. The second optical component is formed with a resin material that allows the laser beams to pass and that is compatible with the resin material forming the holding member, and is fixed to the holding member by laser welding.

6 Claims, 4 Drawing Sheets

OPTICAL APPARATUS, IMAGING APPARATUS, AND MANUFACTURING METHOD FOR OPTICAL APPARATUS WITH HOLDING MEMBER FOR MAINTAINING POSITIONAL RELATION BETWEEN OPTICAL ELEMENTS

CROSS-REFERENCE TO RELATED APPLICATIONS

The present document incorporates by reference the entire contents of Japanese priority document, 2008-314325 filed in Japan on Dec. 10, 2008.

BACKGROUND OF THE INVENTION

1. Field of the Invention

The embodiment discussed herein is related to an optical device that includes multiple optical components arranged in fixed positional relation, and an imaging apparatus that includes the optical device.

2. Description of the Related Art

In recent years, with demands for size reductions of various kinds of apparatuses having imaging functions (hereinafter, "imaging apparatus"), there has been a tendency for the size of optical components to be reduced, such as lenses, or optical devices (optical systems) that are constituted by a multiplicity of optical components. Moreover, for small imaging apparatuses such as mobile telephones and compact cameras, there has been a trend toward imaging devices having more pixels, and with increased pixels of imaging devices, optical apparatuses that are compact and highly precise are demanded.

For example, if a method of assembling optical components at determined positions in a lens barrel by insertion with minimal positioning adjustments is applied, by narrowing the tolerance for respective optical components, the optical components can be assembled with high precision. On the other hand, if the tolerance for the optical components is narrowed, production of the optical components decreases, reducing yields at mass production of optical devices or imaging apparatuses incorporating the optical devices. Moreover, when such a method is applied, the precision (optical performance) of the optical devices depends on the manufacturing precision of components, and therefore, if the tolerance is eased to improve mass production, the precision (optical performance) of the optical devices declines.

For resin products formed using a resin material by injection molding, relatively high manufacturing precision can be maintained with increased accuracy in molding techniques and improvement in precise molding techniques. Therefore, a technique to achieve precision (optical performance) for optical devices when a method of assembling by insertion is applied has conventionally been used in which a positioning structure is provided in a resin optical component to position another optical component, and positioning of the other optical component is performed using this positioning structure.

Moreover, a technique to achieve demanded precision (optical performance) of an optical device by core adjustment has been used conventionally in which optical components related to the optical performance are adjusted based on a reference optical member at assembly of the optical device, for example. Core adjustment is effective when optical components are made from glass, such as lenses formed using a glass material by glass molding.

For glass optical components that are formed using a glass material by glass molding or the like, because it is difficult to achieve high decentration precision with a single glass optical component, core adjustment is required at assembly of an optical system. For example, when a resin lens and a glass lens are both present in an optical device such as a lens unit, the size of which is decreased by directly connecting lenses, by performing core adjustment of the glass lens relative to the resin lens, manufacturing precision of which is high, positional relation between the resin lens and the glass lens is adjusted.

In addition, for glass optical components, because it is difficult to achieve manufacturing precision with a single optical component, it is difficult to provide a positioning structure with high precision to glass optical components. Therefore, for example, when a resin lens and a glass lens are both present, core adjustment is performed using a jig for core adjustment. After core adjustment is performed, positional relation between the resin lens and the glass lens is fixed using adhesive to cement the lenses, for example (for example, Japanese Patent Laid-open Publication No. S63-269323).

For example, a technique of fixing a resin lens and a glass lens using UV curing adhesive has conventionally been used. The UV curing adhesive is applied by potting or the like in the state where positional relation between the resin lens and the glass lens is fixed by a jig for core adjustment. The jig for core adjustment is removed after radiating UV light on the applied adhesive to finish primary curing of the UV curing adhesive. The lenses from which the jig for core adjustment is removed are kept in such a place that secondary curing is promoted, or the like.

Furthermore, a technique of fixing optical components that are inserted in an optical path of an optical pick-up to a base member to which other optical elements are attached, through a holding member that is formed using a material whose linear expansion coefficient is different from that of the base member has conventionally been used (for example, Japanese Patent Laid-open Publication No. H7-210892).

However, in the above conventional technique, if optical components to be fixed to each other by adhesive have different linear expansion coefficients, the degree of expansion caused by a change in the ambient temperature is different between the lenses. If the degree of expansion of the respective lenses differs from each other, compressive stress or stress in a direction of pulling outwards acts on the portion of the adhesive, and the adhesive can deform. If the adhesive deforms, the positional relation between the optical components may change, or the optical components may be contorted to result in degradation of the optical performance.

Deformation of the adhesive becomes significant as changes in the ambient temperature occur repeatedly. As deformation of the adhesive becomes more significant, a change in positional relation between the optical components or contortion of the optical components occurs significantly. Accordingly, as changes in the ambient temperature occur repeatedly, degradation of the optical performance is significant. Problems originating from differences in the linear expansion coefficients of components fixed to each other may occur also with the technique disclosed in Japanese Patent Laid-open Publication No. H7-210892. Further, with this technique, there is another problem that core adjustment cannot be performed.

Moreover, with the conventional technique in which the jig for core adjustment is removed after primary curing of UV curing adhesive, because UV curing adhesive contracts until cure is complete even after primary curing, the positional relation between the resin lens and the glass lens changes due to adhesive contracting during secondary curing. A change in positional relation between the optical components may result in degradation of the optical performance of the optical device.

As a countermeasure against this problem, if the jig for core adjustment is removed after secondary curing is completed, assembly work cannot be proceeded for long time until the jig is removed, and yields in mass production of optical systems, i.e., optical devices or imaging apparatuses including the optical system, is reduced. In addition, a place to store lenses to which the jigs for core adjustment are attached for long time must be prepared, and this may cause increased manufacturing cost.

SUMMARY OF THE INVENTION

It is an object of the present invention to at least solve the above problems in the conventional technologies.

According to an aspect of the present invention, an optical device includes a first optical component and a second optical component that are adjacent to each other in a direction of an optical axis. The optical device further includes a holding member that is formed with a resin material absorbing laser beams and that holds the first optical component via an elastic property of the resin material. The second optical component is formed with a resin material that allows the laser beams to pass and that is compatible with the resin material forming the holding member, and is fixed to the holding member by laser welding.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

A lens apparatus according to an embodiment of the present invention has multiple lenses as optical components. The lenses are arranged inside a substantially cylindrical lens barrel.

Some of or all of the lenses are arranged such that the lenses can move relative to the lens barrel, in the direction of an optical axis. The shape of the lens barrel and a mechanism of moving the respective lenses can be easily implemented by applying a conventional technique, and therefore, explanation therefor is omitted. Some of the lenses constitute a lens unit formed as a single unit. The lens unit may be arranged to be movable relative to the lens barrel in the direction of the optical axis, or may be arranged such that the position relative to the lens barrel is fixed.

The lens apparatus is mounted on a mount (not depicted) or the like included in an imaging apparatus main unit. In the imaging apparatus main unit, an optoelectronic conversion element (not depicted), that is, an imaging device is arranged. The imaging device performs optoelectronic conversion on incident light and outputs an electric signal corresponding to the amount of incident light. The imaging device may be implemented by, for example, a solid state imaging device such as a charge coupled device (CCD) image sensor and a complementary metal oxide semiconductor (CMOS) image sensor.

Figure 1:
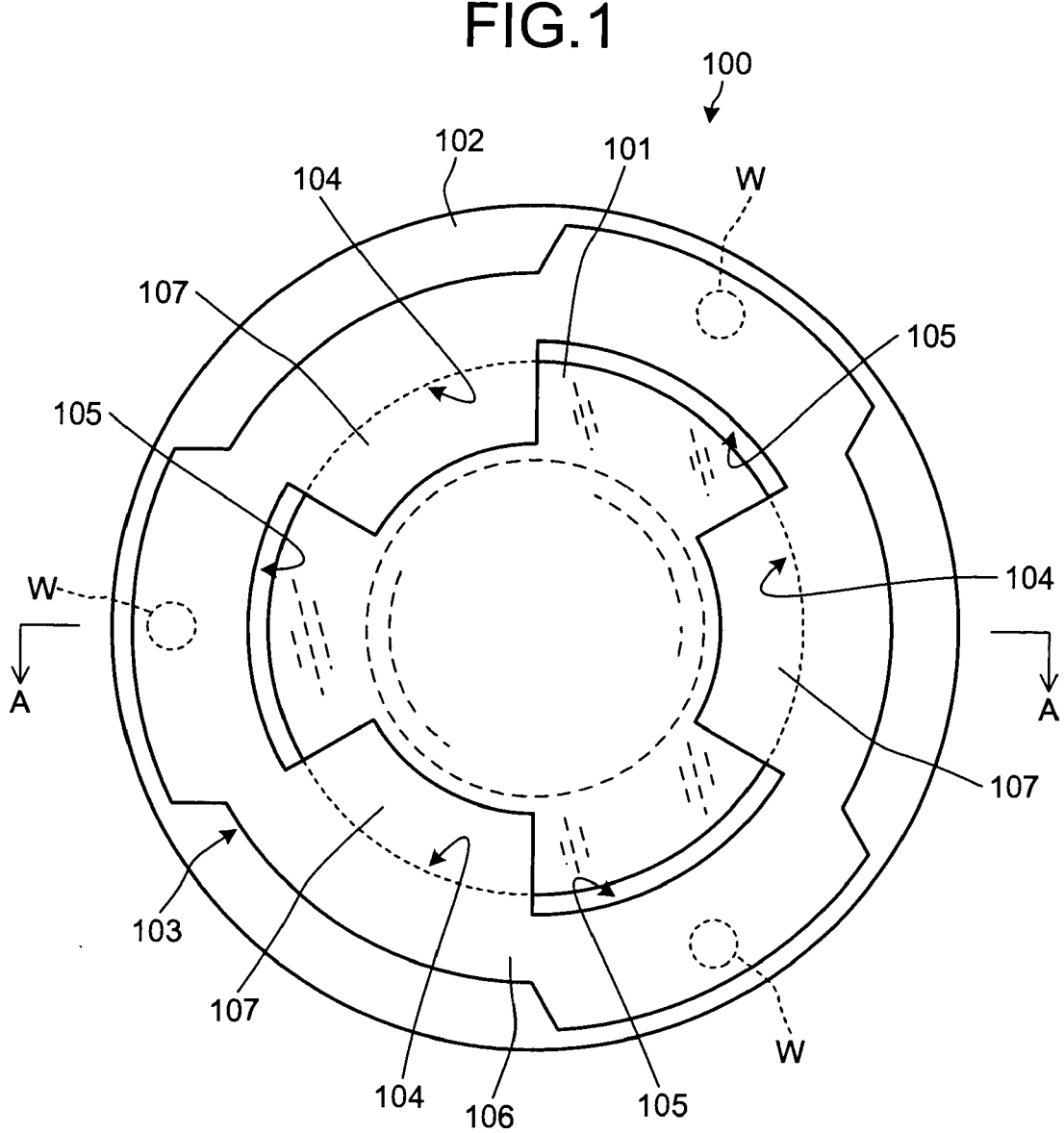
FIGS. 1 and 2 are schematic diagrams for explaining a lens unit included in a lens apparatus according to an embodiment.
Figure 2:
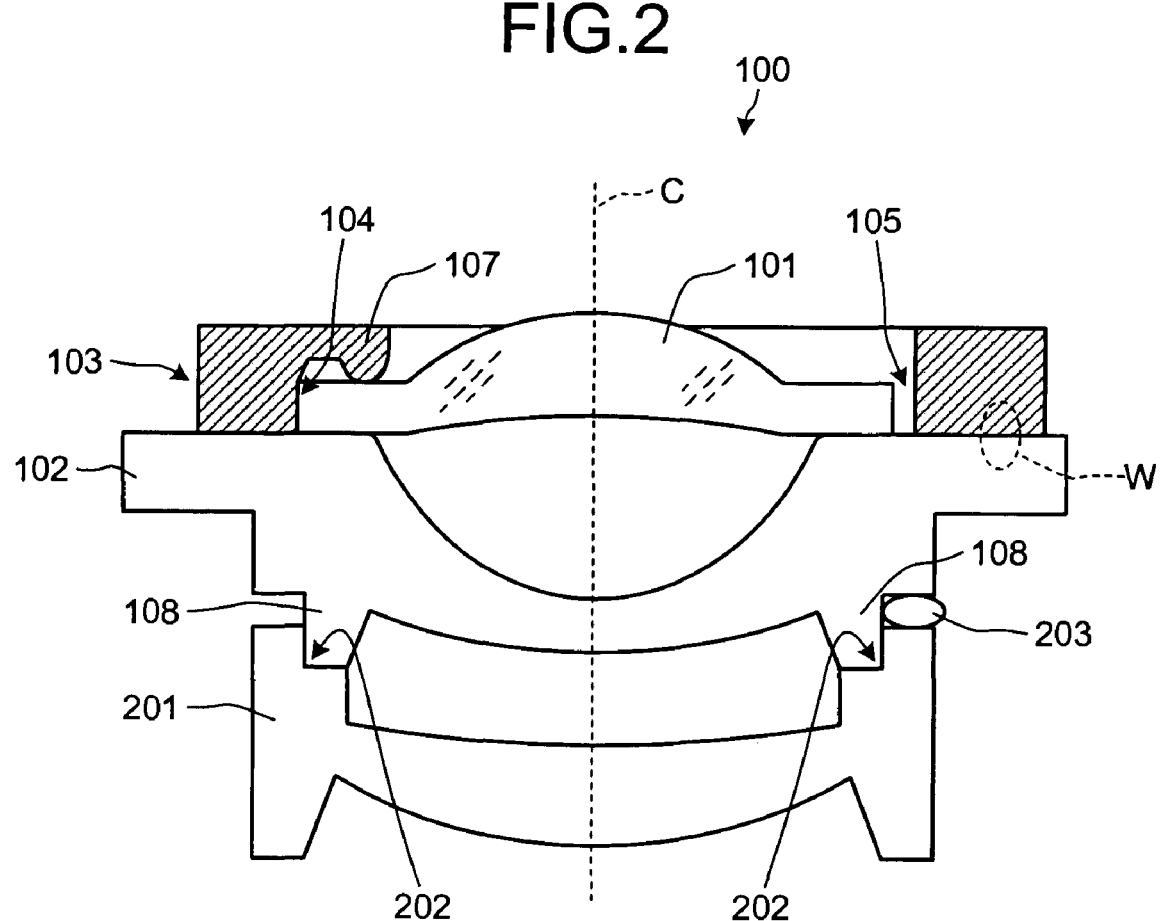

FIG. 1 and FIG. 2 are schematic diagrams for explaining the lens unit included in the lens apparatus according to the embodiment. FIG. 1 illustrates the lens unit viewed from a plane intersecting the optical axis. FIG. 2 illustrates a cross-section (cross-section taken along a line A-A in FIG. 1) of the lens unit in a plane parallel to the optical axis.

As depicted in FIG. 1 and FIG. 2, a lens unit 100 of the lens apparatus according to the embodiment includes a first lens 101, a second lens 102, and a third lens 201. The first lens 101, the second lens 102, and the third lens 201 are arranged inside a lens barrel (not depicted) in a state where the optical axes of the respective lenses 101, 102, and 201 coincide with each other. In this embodiment, to make the optical axes of the first lens 101, the second lens 102, and the third lens 201 coincide is explained as "core adjustment".

The first lens 101 is formed using a glass material by glass molding. The first lens 101 may be formed with a glass material or with a material other than glass material such as a resin material. In this embodiment, the first lens 101 implements a first optical component and is held by a retaining collar 103.

The retaining collar 103 has a substantially ringed-shape having a center at the optical axis C. The inner peripheral surface of the retaining collar 103 is uneven and has small diameter portions 104 and large diameter portions 105. At the small diameter portion 104, a dimension in the direction of the radius of a circle whose center coincides with the optical axis C is smaller than the radius of the first lens 101, and at the large diameter portion 105, a dimension in the direction of the radius of the circle whose center coincides with the optical axis is larger than the radius of the first lens 101. The small diameter portion 104 and the large diameter portion 105 are connected through a connecting portion 106.

The retaining collar 103 forms a ring shape by a connection of the small diameter portions 104, the large diameter portions 105, and the connecting portions 106. The small diameter portion 104, the large diameter portion 105, and the connecting portion 106 are arranged at equal intervals on a concentric circle whose center coincides with the optical axis C. In this embodiment, the small diameter portions 104, the large diameter portions 105, and the connecting portions 106 are arranged at three locations each.

In the retaining collar 103, the small diameter portions 104 are arranged such that the small diameter portions 104 can move in a direction away from the optical axis C in a plane perpendicular to the optical axis C. The connecting portions 106 are displaced according to the displacement of the small diameter portion 104. The small diameter portions 104 and the connecting portions 106 are displaced in a direction such that the small diameter portions 104 and the connecting portions 106 are positioned between the large diameter portions 105. Thus, the retaining collar 103 is arranged to be deformable such that the inner diameter thereof increases by displacing the small diameter portions 104 and the connecting portions 106.

The first lens 101 is positioned at an inner peripheral portion of the retaining collar 103 that is deformed to increase the inner diameter. The retaining collar 103 holds the first lens 101 by bringing the small diameter portion 104 abut against the rim of the first lens 101 and by causing a force toward the optical axis from the small diameter portion 104 to act on the first lens 101. In this embodiment, the retaining collar 103 implements a holding member. In the retaining collar 103, the force toward the optical axis C from the small diameter portion 104 is generated from an elastic property of the material of the retaining collar 103, and originates from a restoring force of the small diameter portion 104 acting to restore to the original position.

The outer diameter of the first lens 101 is larger than the diameter of the circle that is formed by the small diameter portion 104 and whose center coincides with the optical axis C. Therefore, in the retaining collar 103 holding the first lens 101, a force acting to restore to the original shape, that is, a force toward such a direction that the inner diameter decreases is generated by the elasticity of the resin material of the retaining collar 103.

As described, the first lens 101 having an outer diameter larger than the inner diameter of the retaining collar 103 is positioned inside the inner periphery of the retaining collar 103, and the first lens 101 is held by the elasticity of the retaining collar 103. By holding the first lens 101 by the elasticity of the retaining collar 103, the positional relation between the retaining collar 103 and the first lens 101 is fixed without using adhesive or the like.

The retaining collar 103 has a protrusion 107 that protrudes from the inner peripheral surface of the retaining collar 103 toward the optical axis. The protrusion 107 is arranged in plural (three in this embodiment), and the protrusions 107 are arranged at the small diameter portions 104, respectively. Thus, the protrusions 107 are arranged at equal intervals on a concentric circle whose center coincides with the optical axis C. The protrusions 107 are arranged to abut the first lens 101 from one side in the direction of the optical axis in a state where the retaining collar 103 holds the first lens 101.

The retaining collar 103 holds the first lens 101 by abutting the protrusions 107 on one side of the first lens 101, and by the action of a force pushing the first lens 101 toward one side (lens holder side) in the direction of the optical axis. It is preferable that the small diameter portions 104 and the protrusions abut the first lens 101 at three or more locations each on a concentric circle whose center coincides with the optical axis C. As a result, through a force of the protrusion 107, the glass lens can be forced into the resin lens in the direction of the optical axis.

Further, through the action of a pushing force pushing the first lens 101 on one side in the direction of the optical axis, the first lens 101 abuts the second lens 102. It is preferable that the number of points at which the small diameter portion 104 and the protrusions 107 abut the first lens 101 be three or multiples of three. Thus, the force equally acts on the entire part of the first lens 101, and the first lens 101 is stably held.

The retaining collar 103 is formed using a resin material and is formed by injection molding. By forming the retaining collar 103 by injection molding using a resin material, the retaining collar 103 is formed with high precision. A resin material forming the retaining collar 103 has a property of absorbing laser beams.

The resin material to form the retaining collar 103 may be obtained by mixing or dispersing a material that absorbs laser beams in a resin material to be a base material, for example. In this embodiment, for example, a black polycarbonate (PC) resin material may be used.

Light amplification by stimulated emission of radiation (LASER) is coherent light that is obtained by amplifying light (electromagnetic waves), and a wavelength in a near infra-red area can be used, for example. For example, YAG LASER can be used. More specifically, it is preferable that laser beams of 800 nm to 1100 nm be used using, for example, YAG laser, YVO4 laser, semiconductor laser, and the like.

YAG in YAG LASER is derived from the first letters of yittrium, aluminum, and garnet. YVO4 in YVO4 laser is an abbreviated form of yittrium vanadate (YVO4), and indicates one type of laser medium of a solid laser oscillator. Laser beams are not limited to those of a wavelength in a near infra-red area, and may be laser beams of a wavelength shorter than that of visible rays such as ultraviolet (UV) rays and X rays, or may be laser beams of a wavelength longer than visible rays such as infra-red rays.

A linear expansion coefficient of the resin material of the retaining collar 103 differs from a linear expansion coefficient of the glass material of the first lens 101. Therefore, when a change in ambient temperature occurs, causing a change in volume such as expansion and contraction of the first lens 101 and the retaining collar 103, the first lens 101 and the retaining collar 103 exhibit different changes in volume.

The second lens 102 is arranged adjacent to the first lens 101 in the direction of the optical axis. The second lens 102 is formed using a resin material, and is formed by injection molding. By forming the second lens 102 by injection molding using a resin material, the second lens 102 is formed with high precision.

The second lens 102 is compatible with the resin material of the retaining collar 103. The resin material forming the second lens 102 may be, for example, the same kind of resin material as the resin material being the base material of the retaining collar 103. In this embodiment, for example, a resin material whose main component is PC may be used. Furthermore, the resin material to form the second lens 102 has a property of allowing laser beams to pass through.

The resin material to form the second lens 102 may be obtained by mixing or dispersing a material that allows laser beams to pass through in a resin material to be a base material, for example. More specifically, for example, by mixing or dispersing a material that allows laser beams to pass through in the same kind of resin material as the resin material being the base material of the retaining collar 103, the resin material to form the second lens 102 is obtained. In this embodiment, for example, a transparent PC resin material may be used. In this embodiment, the second lens 102 implements a second optical component.

The second lens 102 is joined to the retaining collar 103 by laser welding. In FIG. 1 and FIG. 2, joints between the second lenses 102 and the retaining collars 103 by laser welding are indicated by a reference character W. Laser welding is a technique of combining joining subject materials at a molecular level by heating the joining subject materials made from a thermoplastic resin to a temperature exceeding the melting point of the resin material using laser beams, and by applying pressure to the joining subject materials in the heated state.

At laser welding, basically, laser beams are irradiated on an interface between a joining subject material (hereinafter, "laser absorbing material") that is made from a thermoplastic resin material having a property of absorbing laser beams and a joining subject material (hereinafter "laser passing material") that is made from a thermoplastic resin material having a property of allowing laser beams to pass through, from the laser passing material side.

As a technique of combining at a molecular level, joining subject materials made from a thermoplastic resin material, impulse welding, heat plate welding, non-contact heat plate welding, ultrasonic welding, high frequency welding, vibration welding, infra-red welding, and the like are applicable other than laser welding. However, with laser welding, the irradiation area of laser beams can be very small, and therefore, laser welding enables to reliably join materials even when the size of the joining subject materials is small. In addition, vibration is not applied in laser welding, and therefore, occurrence of harmful effects caused by vibration at joining, such as damage of the joining subject material, is prevented.

Resin materials used in laser welding may be created by including various kinds of color materials in a predetermined material to be a base material. A resin material that includes a color material that can efficiently absorb and convert into heat, laser beams of a used wavelength band, may be used as a thermoplastic resin material having a property of absorbing laser beams. Moreover, a resin material that includes, for example, a color material of dye type that allows most laser beams of a used wavelength band to pass through may be used as a thermoplastic resin material having a property of allowing laser beams to pass through.

In laser welding, laser beams are irradiated to reach the laser absorbing material without melting a surface of the laser passing material, and the temperature of the laser absorbing material is brought to temperature higher than the melting point of the laser absorbing material. The heat of the laser absorbing material is conducted to the laser passing material to melt the laser passing material. Molecules of the laser absorbing material and the laser passing material are mixed at the melted portions. When irradiation of the laser beams is stopped, the temperature of the melted resin materials becomes lower than the melting point, and the welding is completed.

By joining the joining subject materials by laser welding, the joining subject materials are joined without using adhesive. Thus, harmful effects to the environment caused by using adhesive can be suppressed. In addition, because adhesive is not required, the weight can be reduced compared to a case of using adhesive.

The third lens 201 is formed using a resin material and is formed by injection molding. By forming the third lens 201 by injection molding using a resin material, the third lens 201 is formed with high precision. The third lens 201 has step portions 202 for positioning. The step portions 202 determine positional relation between the third lens 201 and the second lens 102.

The second lens has protrusions 108 that protrude toward the side of the third lens 201, and by engaging the step portions 202 with the protrusions 108, the position relative to the second lens 102 is determined. In the state where the step portions 202 are engaged with the protrusions 108, an empty space is formed at a part between the second lens 102 and the third lens 201 in the direction of the optical axis. This space is in a ring shape whose center coincides with the optical axis C.

In this space, an adhesive 203 is provided, and the positional relation between the second lens 102 and the third lens 201 is fixed by the adhesive 203. It is preferable that the adhesive 203 be provided at a part of the space in a ring shape. This enables weight reduction of the lens unit 100, and prevents a change of positional relation between the second lens 102 and the third lens 201 due to a change in volumes occurring with cure of the adhesive 203. By using, for example, a UV curing adhesive as the adhesive 203, high workability in assembling work of the lens unit 100 is achieved.

Figure 3:
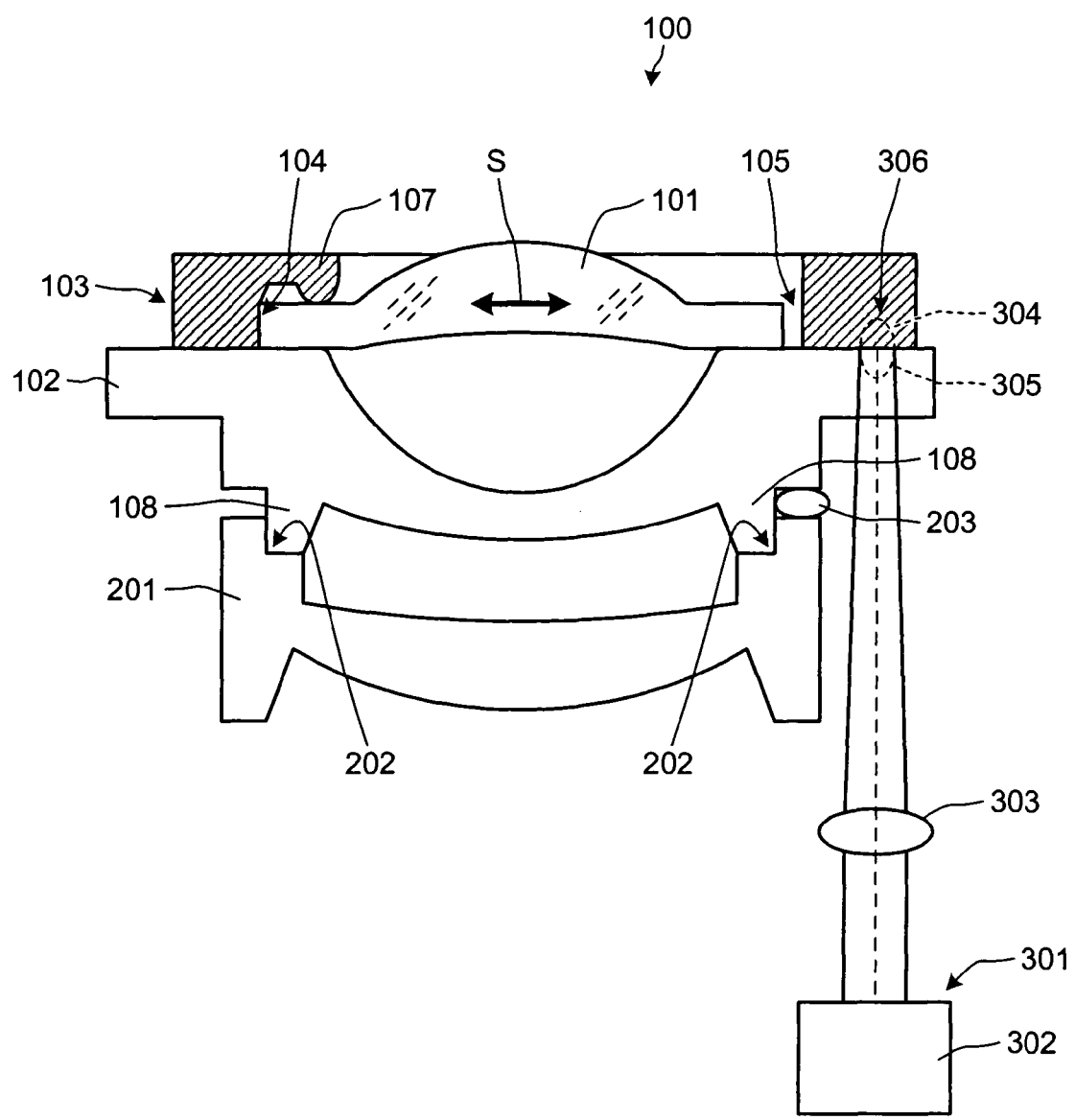
FIG. 3 is a schematic diagram for explaining a method of joining the retaining collar 103 and the second lens 102.

FIG. 3 is a schematic diagram for explaining a method of joining the retaining collar 103 and the second lens 102. At joining the retaining collar 103 and the second lens 102, first, the position of the retaining collar 103 relative to the second lens 102 is determined. The position of the retaining collar 103 may be, for example, the position at which the optical axis of the first lens 101 held by the retaining collar 103 coincides with the optical axis of the second lens 102.

The position of the optical axis of the first lens relative to the optical axis of the second lens 102, that is, the position of the retaining collar 103 relative to the second lens 102 is adjusted by moving, relative to the second lens 102, the retaining collar 103 holding the first lens 101 and placed perpendicular to the optical axis (as indicated by an arrow S).

When the positional relation between the retaining collar 103 and the second lens 102 is adjusted to such a positional relation that the optical axis of the first lens 101 coincides with the optical axis of the second lens 102, the positional relation between the retaining collar 103 and the second lens 102 is fixed using a jig. This jig is only required to maintain the positional relation between the retaining collar 103 and the second lens 102 temporarily, and it is preferable that the jig be removed after joining by laser welding.

Next, from the side of the second lens 102, laser beams are irradiated to the retaining collar 103 and the second lens 102 fixed by the jig. Irradiation of the laser beams is performed by using a predetermined laser irradiation apparatus 301. The laser irradiation apparatus 301 has a laser beam source 302, a lens 303 that condenses the laser beams emitted from the laser beam source 302, and the like. The laser irradiation apparatus 301 can be easily achieved using various conventional techniques, and therefore, the explanation therefor is omitted.

The irradiated laser beams pass through the second lens 102 and reach the retaining collar 103. Because the resin material of the retaining collar 103 has a property of absorbing laser beams, the laser beams reaching the retaining collar 103 are absorbed by the retaining collar 103 and are converted into thermal energy at the retaining collar 103. The thermal energy converted from the optical energy at the retaining collar 103 raises the temperature of the retaining collar 103. In the retaining collar 103, only a portion at which the temperature has risen to a temperature higher than the melting point melts to form a molten pool 304.

Because the retaining collar 103 contacts the second lens 102, the thermal energy that has been generated at the retaining collar 103 to generate the molten pool 304 is conducted to the second lens 102 to raise the temperature of the second lens 102. In the second lens 102, only a portion at which the temperature has risen to temperature higher than the melting point melts to form a molten pool 305. The resin material forming the molten pool 304 in the retaining collar 103 and the resin material forming the molten pool 305 in the second lens 102 are mixed with each other, to form a molten pool 306. The molten pool 306 includes the resin material forming the retaining collar 103 and the resin material forming the second lens 102.

Because the retaining collar 103 and the second lens 102 are formed using compatible resin materials, the resin material forming the retaining collar 103 and the resin material forming the second lens 102 are uniformly mixed in the molten pool 306 formed by the molten pool 304 of the retaining collar 103 and the molten pool 305 of the second lens 102.

When irradiation of laser beams is stopped after the molten pool 306 is formed by the retaining collar 103 and the second lens 102, the temperature of the resin material in the molten pool 306 drops to cure. Because the resin material forming the retaining collar 103 and the resin material forming the second lens 102 are mixed in the molten pool 306, when the temperature of the resin material in the molten pool 306 decreases and the resin material cures, the retaining collar 103 and the second lens 102 are joined through the resin material forming the molten pool 306.

Because laser beams can be irradiated precisely to a position having a small irradiation area, it is possible to form molten pools in the retaining collar 103 and the second lens 102 only at positions desired to be joined. Thus, the retaining collar 103 and the second lens 102 are joined without degrading the appearance at joints.

Laser beams can be irradiated at a single point or more than one point. When laser beams are irradiated at more than one point, it is preferable that laser beams be irradiated on a concentric circle whose center coincides with the optical axis C. Moreover, when laser beams are irradiated at more than one point, it is preferable that laser beams are irradiated at equal intervals on a concentric circle whose center coincides with the optical axis C.

It is preferable that a point at which laser beams are irradiated be on the large diameter portion 105. Thus, the retaining collar 103 and the lens holder can be fixed by laser welding without affecting deformation of the retaining collar 103 occurring with a change in the size of the outer diameter of the first lens 101, that is, displacement of the small diameter portion 104.

It is preferable that the number of points at which laser beams are irradiated be the same as the number of points at which the small diameter portions 104 and the first lens 101 abut with each other, and that the points be positioned on an identical circle on which the abutting portions of the small diameter portions 104 and the first lens 101 are positioned, and at an intermediate position between the abutting portions. When laser beams are irradiated at more than one point, it is preferable that laser beams be irradiated at the same time to the respective points. Irradiation of laser beams is not limited to be done simultaneously, and laser beams may be irradiated to the respective points within a short time period that can be regarded as substantially at the same time.

As described, the lens apparatus according to the embodiment as an example of the optical device of the present invention includes the first lens 101 as an example of the first optical component, and the second lens 102 as an example of the second optical component. The lens apparatus further includes the retaining collar 103 as an example of the holding member that is formed with a resin material that absorbs laser beams, and that holds the first lens 101 via the elasticity of the resin material. The second lens 102 is formed with a resin material that allows laser beams to pass through and has compatibility with a material forming the retaining collar 103, and is fixed to the retaining collar 103 by laser welding.

According to the above structure, the retaining collar 103 that holds the first lens 101 and the second lens 102 is fixed in a short time by laser welding and thus, it is possible to prevent a change in relational position between the first lens 101 and the second lens 102 occurring at fixing as in the case of using the adhesive 203 whose volume contracts during cure, for example.

When the first lens 101 is formed using glass (K-PFK85) whose linear expansion coefficient is $129 \times 10^{-7}$ and the second lens 102 is formed using a PC resin (AD5503) whose linear expansion coefficient is $700 \times 10^{-7}$, the second lens 102, which is a resin lens, expands more than the first lens 101, which is a glass lens, when the ambient temperature increases. Furthermore, in this case, when the ambient temperature decreases, the first lens 101, which is a glass lens, contracts more than the second lens 102, which is a resin lens.

Figure 4:
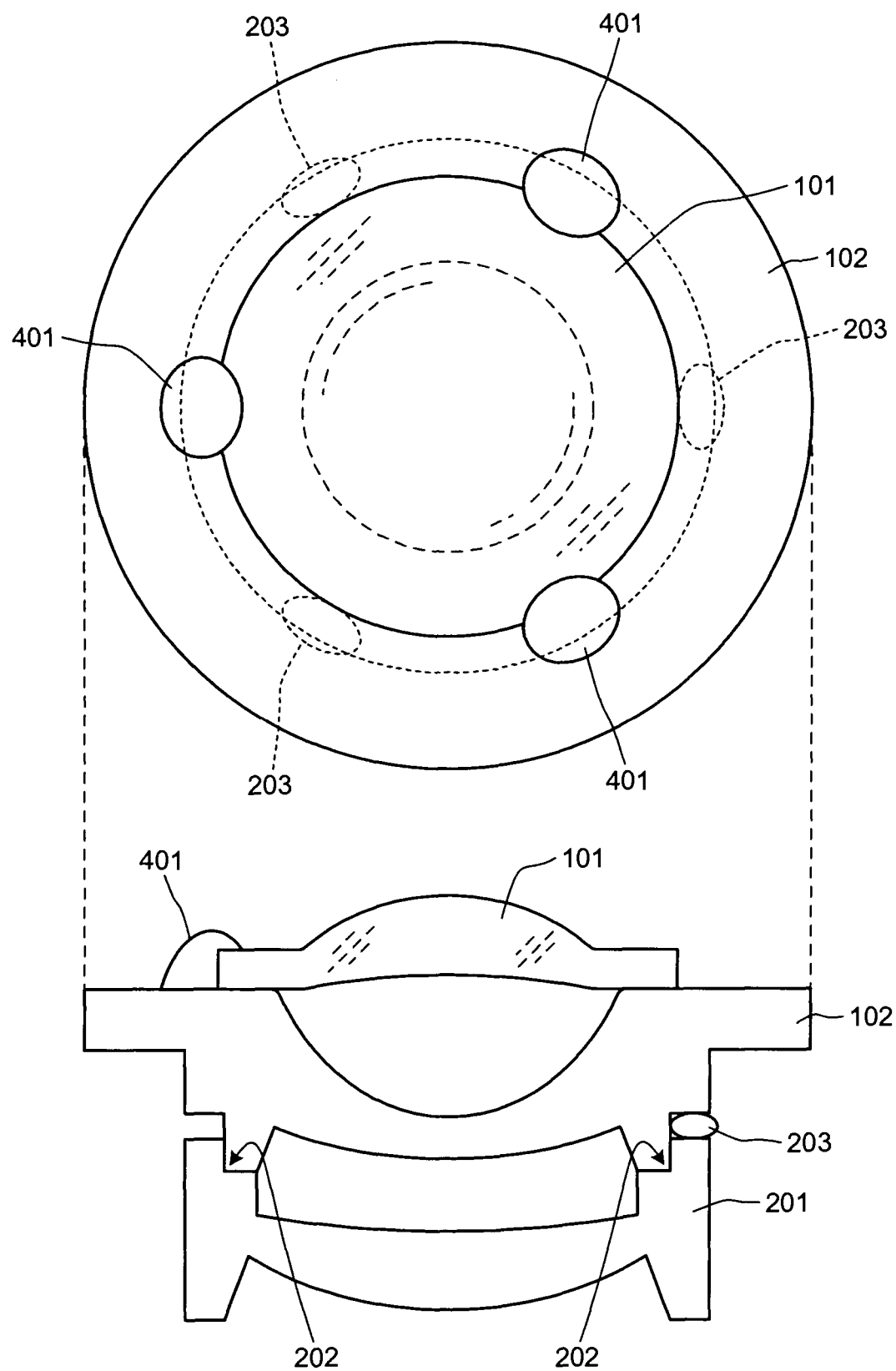
FIG. 4 is a schematic diagram for explaining a conventional lens unit.

FIG. 4 is a schematic diagram for explaining a conventional lens unit. In FIG. 4, the lens unit viewed from a plane intersecting the optical axis and a cross-section of the lens unit taken on a plane parallel to the optical axis are depicted. For the conventional lens unit, reference numerals identical to those used above indicate similar components. As depicted in FIG. 4, the first lens 101 and the second lens 102 are fixed by a conventional fixing method using an adhesive 401.

As described, because the linear expansion coefficients of the first lens 101 and the second lens 102 are different from each other, a degree of contraction caused by a change in the ambient temperature is different between the first lens 101 and the second lens 102. If the degrees of contraction of the respective lenses differ from each other, compressive stress or stress in a direction of pulling outwards acts on the portion of the adhesive 401, and the adhesive 401 may deform.

If the adhesive deforms, the positional relation between the first lens 101 and the second lens 102 may change, or the first lens 101 and the second lens 102 may become contorted. As described, if the conventional fixing method using the adhesive 401 is used, optical performance may be degraded as a result of changes in the ambient temperature. Deformation of the adhesive 401 becomes significant as changes in the ambient temperature occur repeatedly. As deformation of the adhesive 401 becomes more significant, the change in positional relation between the first lens 101 and the second lens 102 or contortion of the first lens 101 and the second lens 102 occurs significantly. Accordingly, as changes in the ambient temperature occur repeatedly, degradation of the optical performance is significant.

To cope with such problems associated with a conventional lens unit, according to the lens apparatus of this embodiment, the retaining collar 103 elastically deforms corresponding to deformation, such as expansion and contraction, of the first lens 101 caused by a change in the ambient temperature. In other words, because the retaining collar 103 can deform with deformation of the first lens 101, a difference in an amount of deformation when the first lens 101 deforms more than the second lens 102 because of a change of the ambient temperature can be canceled by deformation of the retaining collar 103. Thus, the position of the first lens 101 relative to the retaining collar 103 is stabilized, and a change in positional relation between the first lens 101 and the second lens 102 is prevented.

Moreover, according to the lens apparatus of this embodiment, a difference in the amount of deformation when the second lens 102 deforms more than the first lens 101 because of a change of the ambient temperature is canceled by deformation of the retaining collar 103, and deformation of the second lens 102 is suppressed. This enables to ease internal stress generated in the third lens 201 that is positioned based on the second lens 102. Thus, the position of the first lens 101 with respect to the position determining portion in the second lens 102 is consistently stabilized.

Furthermore, according to the lens apparatus of this embodiment, when the ambient temperature changes after the retaining collar 103 and the second lens 102 are fixed, the retaining collar 103 and the second lens 102 that are formed with resin materials deform. This enables to suppress a change in positional relation between the retaining collar 103 and the second lens 102, and to prevent a change in positional relation between the first lens 101 and the second lens 102.

The lens apparatus according to the embodiment has welding joints, not on the small diameter portion holding the glass lens, but on the large diameter portion which does not abut the glass lens and thus, the glass lens is assuredly held and after the laser welding, changes in positional relation resulting from an outward force pulling the first lens toward the supporting member caused by changes in the ambient temperature are prevented, ensuring stable imaging performance.

The lens apparatus according to the embodiment is configured such that the retaining collar 103 does not cover the outer perimeter side of the second lens 102. Before fixing the second lens 102 to the retaining collar 103 by laser welding, the optical axis of the first lens 101, which is integrated with the retaining collar 103, is aligned with the optical axis of the second lens 102 and thus, before assembling the lens support frame, core adjustment of the lenses is performed facilitating assembly work.

Further, the lens apparatus according to the embodiment, by the retaining collar 103 abutting the first lens 101, a force pushing the first lens 101 toward the second lens 102 is generated and through this force, the first lens 101 abuts the second lens 102 and thus, by causing the glass lens to abut the resin lens, adherence of the glass lens and the resin lens improves and core adjustment work is facilitated, thereby enabling optical precision to be improved.

Moreover, according to an imaging apparatus including the lens apparatus of this embodiment, the second lens 102 and the retaining collar 103 holding the first lens 101 are fixed in short time by laser welding. This enables to avoid a change in positional relation between the first lens 101 and the second lens 102 caused at fixing as in the case where the adhesive 401 which contracts during cure is used to fix the lenses.

Furthermore, according to an imaging apparatus that includes the lens apparatus of this embodiment, the position of the first lens 101 relative to the retaining collar 103 is stabilized because the retaining collar 103 elastically deforms corresponding to deformation, such as expansion and contraction, of the first lens 101 caused by a change of the ambient temperature. Moreover, according to an imaging apparatus including the lens apparatus of this embodiment, a change in positional relation between the retaining collar 103 and the second lens 102 is prevented because the retaining collar 103 and the second lens 102 that are formed with resin materials deform when the ambient temperature changes after the retaining collar 103 and the second lens 102 are fixed.

Thus, it is possible to prevent degradation of the optical performance of the lens apparatus due to a change in positional relation between the first lens 101 and the second lens 102 occurring in the course of fixing, a change in positional relation between parts caused by a change of the ambient temperature, and contortion of each part. By thus preventing degradation of the optical performance of the lens apparatus, degradation in image quality of the imaging apparatus is prevented.

Although in the embodiment described above, application to an optical device such as a lens apparatus has been described, a parts-joining mechanism according to the present invention is not limited to application to an optical device. The parts-joining mechanism according to the present invention is also applicable to various kinds of devices having a multiplicity of parts that are fixed using laser welding.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical device that includes a first optical component and a second optical component that are adjacent to each other in a direction of an optical axis, the optical device comprising:
    a holding member that is formed with a resin material absorbing laser beams, and that holds the first optical component via an elastic property of the resin material, wherein
    the first optical component is formed with glass,
    the second optical component is formed with a resin material that allows the laser beams to pass through and that is compatible with the resin material forming the holding member, and is fixed to the holding member by laser welding,
    the holding member comprises:
        small diameter portions that have an inner diameter smaller than an outer diameter of the first optical component and hold the first optical component by abutting part of a rim of the first optical component; and
        large diameter portions that have an inner diameter larger than the outer diameter of the first optical component and connect the small diameter portions,
    the small diameter portions are configured to be displaced toward a direction of a radius of the first optical component from the optical axis, and
    the large diameter portions are fixed by laser welding.

2. The optical device according to claim 1, wherein
    the holding member does not cover an outer perimeter of the second optical component,
    the second optical component, prior to being laser welded to the holding member, is aligned with the first optical component integrated with the holding member, by aligning an optical axis of the first optical component with an optical axis of the second optical component.

3. The optical device according to claim 1, wherein
    the holding member, by abutting the first optical component, generates a force that pushes the first optical component toward the second optical component, and
    the first optical component abuts the second optical component as a result of the generated force.

4. The optical device according to claim 1, wherein
    the holding member is formed with a material obtained by mixing into a base resin material, a material that absorbs the laser beams, and
    the second optical component is formed with a material obtained by mixing into a resin material that is a similar kind as the base resin material, a material that allows the laser beams to pass through.

5. An imaging apparatus comprising:
    a holding member that is formed with a resin material absorbing laser beams, and that holds a first optical component formed with glass via an elastic property of the resin material;
    a second optical component that, in a direction of an optical axis, is adjacent to the first optical component, is formed with a resin material that allows the laser beams to pass through and that is compatible with the resin material forming the holding member, and is fixed to the holding member by laser welding; and
    an imaging optoelectronic component that converts into an electrical signal, external light received through the first optical component and the second optical component, wherein
    the holding member comprises:
        small diameter portions that have an inner diameter smaller than an outer diameter of the first optical component and hold the first optical component by abutting part of a rim of the first optical component; and
        large diameter portions that have an inner diameter larger than the outer diameter of the first optical component and connect the small diameter portions, the small diameter portions are configured to be displaced toward a direction of a radius of the first optical component from the optical axis, and the large diameter portions are fixed by laser welding.

6. An optical device manufacturing method comprising:

holding a first optical component by a ring-shaped holding member formed with a resin material that absorbs laser beams and is compatible with a material forming a second optical component, the first optical component and the second optical component being adjacent to each other in a direction of an optical axis and respectively formed using materials having different linear expansion coefficients, the first optical component being formed with glass and the second optical component being formed with a resin material that allows the laser beams to pass through;

aligning an optical axis of the first optical component held by the holding member with an optical axis of the second optical component;

abutting the holding member with the second optical component in a state where the optical axis of the first optical component is aligned with the optical axis of the second optical component;

applying, through the second optical component, the laser beams to the holding member abutting the second optical component; and stopping application of the laser beams, wherein the holding member comprises:

small diameter portions that have an inner diameter smaller than an outer diameter of the first optical component and hold the first optical component by abutting part of a rim of the first optical component; and large diameter portions that have an inner diameter larger than the outer diameter of the first optical component and connect the small diameter portions, the small diameter portions are configured to be displaced toward a direction of a radius of the first optical component from the optical axis, and the large diameter portions are fixed by laser welding.

* * * * *